United States Patent
Binzel

(10) Patent No.: US 6,985,733 B2
(45) Date of Patent: Jan. 10, 2006

(54) METHOD AND APPARATUS FOR SCANNING FOR NEIGHBORING CELLS

(75) Inventor: Charles Philipp Binzel, Bristol, WI (US)

(73) Assignee: Motorola, Inc., Schaumburg, IL (US)

( * ) Notice: Subject to any disclaimer, the term of this patent is extended or adjusted under 35 U.S.C. 154(b) by 148 days.

(21) Appl. No.: 10/219,231

(22) Filed: Aug. 15, 2002

(65) Prior Publication Data

US 2004/0033804 A1    Feb. 19, 2004

(51) Int. Cl.
*H04Q 7/20*    (2006.01)

(52) U.S. Cl. .................. 455/437; 455/434; 455/513; 455/226.2

(58) Field of Classification Search ........ 455/436–439, 455/435.3, 446, 447, 448, 440, 452.2, 423, 455/509–518, 67.11–67.13, 434, 450–452.1, 455/63.1–63.3, 67.7, 226.1–226.4
See application file for complete search history.

(56) References Cited

U.S. PATENT DOCUMENTS

| | | | |
|---|---|---|---|
| 4,794,635 A * | 12/1988 | Hess | 455/513 |
| 5,258,981 A | 11/1993 | Davey et al. | |
| 5,263,055 A | 11/1993 | Cahill | |
| 5,448,750 A * | 9/1995 | Eriksson et al. | 455/452.2 |
| 5,809,419 A | 9/1998 | Schellinger et al. | |
| 5,915,221 A * | 6/1999 | Sawyer et al. | 455/437 |
| 5,966,657 A * | 10/1999 | Sporre | 455/425 |
| 6,067,460 A | 5/2000 | Alanara et al. | |
| 6,128,473 A * | 10/2000 | Ritzen et al. | 455/63.3 |
| 6,205,334 B1 | 3/2001 | Dent | |
| 6,240,275 B1 * | 5/2001 | H'Mimy et al. | 455/62 |
| 6,392,565 B1 | 5/2002 | Brown | |
| 6,393,284 B1 | 5/2002 | Dent | |
| 6,556,829 B1 * | 4/2003 | Persson | 455/437 |
| 6,570,861 B1 * | 5/2003 | Marsan et al. | 370/330 |
| 2002/0168020 A1 * | 11/2002 | Justice et al. | 375/295 |

FOREIGN PATENT DOCUMENTS

WO    WO 99/43099    8/1999

* cited by examiner

*Primary Examiner*—Charles Craver
(74) *Attorney, Agent, or Firm*—Lawrence J. Chapa

(57) ABSTRACT

The present invention provides a method and apparatus for reducing scanning times by eliminating from consideration channels where the measured power is substantially comprised of adjacent channel power. The method and apparatus include measuring the received channel power (302) from neighboring cells, and attempting to acquire or otherwise identifying signals from the channels of the neighboring cells (306) in descending order of a sorted list of received channel power. When a signal from the channel of a neighboring cell is successfully acquired or otherwise identified, an amount of adjacent channel power is determined (310), based upon an expected power profile of the acquired or otherwise identified signal. The determined adjacent channel power is then compared against the power measured for the corresponding channel (312). Where the measured power is substantially comprised of adjacent channel power, the channel is removed from the list of channels to acquire (316).

18 Claims, 4 Drawing Sheets

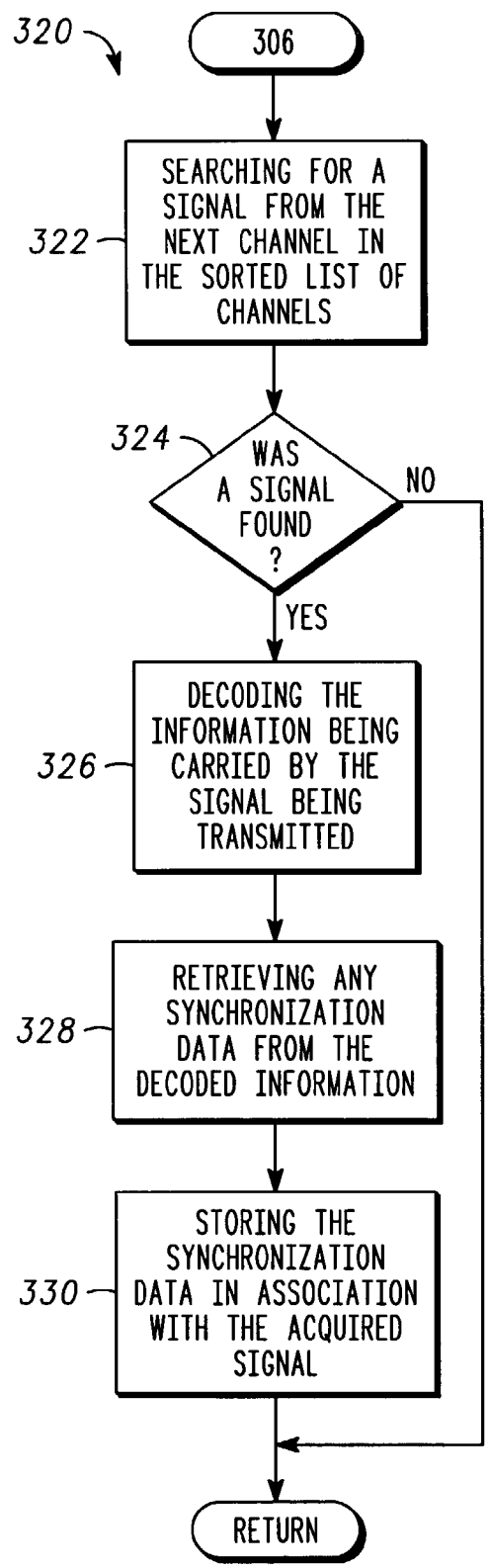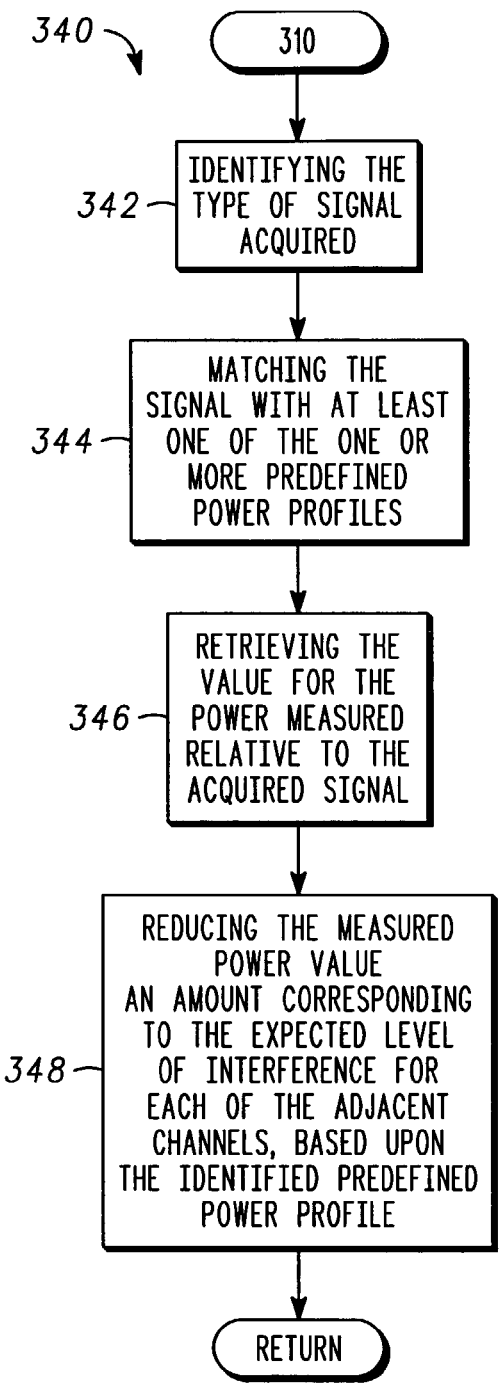
FIG. 5
FIG. 6

METHOD AND APPARATUS FOR SCANNING FOR NEIGHBORING CELLS

FIELD OF THE INVENTION

The present invention relates generally to the scanning of neighboring cells by a wireless communication device in a cellular communication network and, more particularly, to reducing scanning times by eliminating from consideration channels where the measured power is substantially comprised of adjacent channel power.

BACKGROUND OF THE INVENTION

Mobile subscribers use wireless communication devices to communicate over a cellular wireless communication network by transmitting and receiving wireless signals between the wireless communication devices and one or more base stations, located at varying distances proximate to the various mobile subscribers.

Changing conditions, including movement of the mobile subscribers relative to the one or more base stations, will often necessitate that the wireless communication devices identify a different base station for facilitating further communication within the network. A decision to select a new serving base station, based upon the movement of the mobile subscriber relative to the one or more base stations, is often the result of a change in the received signal strength between the wireless communication devices and the previous serving base station. Either the received signal strength between the previous serving base station has degraded to an unacceptable level and/or a stronger signal is now available between the wireless communication device and a new alternative base station.

To insure that the wireless communication device is consistently communicating with the best available serving base station, a wireless communication device will periodically scan for neighboring cells and corresponding base stations. When appropriate, a communication device will initiate a reselection or a handover. A handover occurs when a new serving base station is selected, while the wireless communication device is in dedicated mode (e.g. when a call is in progress). A reselection occurs when a new serving base station is selected, while the wireless communication device is in idle mode. A similar selection process will also take place when power is initially applied to the wireless communication device, and the wireless communication device is initially locating itself within the network.

Medium-sized band GSM systems, corresponding to the Global System for Mobile Communications, generally provide 200 kHz carrier separation between channels. However, given the power profile of a typical signal, spilled power can occur in several sequentially adjacent channels at various attenuation levels. The GSM specification defines a reference interference level for several sequentially adjacent channels, which corresponds to a detectability level and the allowable amounts of adjacent channel power. In the case of an immediately adjacent channel or a channel 200 kHz away, the GSM specification provides a reference interference level that is less than −9 dB, relative to the power transmitted on the primary channel. For adjacent channels 400 kHz and 600 kHz away, the GSM specification requires that the reference interference level not exceed −41 dB and −49 dB, respectively.

The GSM specification further provides a detection margin of 9 dB. This translates to a limit of spilled power in the amounts of −18 dB in an immediately adjacent channel, and requires that the spilled power not exceed −50 dB and −58 dB for channels 400 kHz and 600 kHz away, respectively.

In some instances, the spilled power in an adjacent channel can have a power level, which is sufficiently strong to be observable by the wireless communication device. For example, if a primary signal was received by the wireless communication device with a signal strength of −41 dB, the immediately adjacent channel might have a power level as seen by the wireless communication device, which is substantially comprised of spilled power, that has a power level of −59 dB, and still be within the limits for spilled power allowed in the specification. Furthermore, a channel having a power level of −59 dB is sufficiently strong, so as to be identified as a channel having a potentially detectable signal. Generally, to have sufficient power for receiving a signal on a particular channel, the signal needs to have a signal strength greater than −104 dBm, also known as the reference sensitivity level. In the same example, spilled power can produce a channel power level of −91 dB and −99 dB in the adjacent channels 400 kHz and 600 kHz away, respectively, that is seen by the wireless communication device. At −91 dB and −99 dB, both of the channel power levels are similarly sufficiently strong to be identified as channels, which potentially have signals of interest.

Preferably, standard frequency planning will provide that nearby channels will not be used in the same geographical area, in order to minimize the effects of interfering spilled power from an adjacent channel. However sometimes, even if the nearby channels have not been used, the system can still include the nearby channel in a list of defined neighboring cells that is transmitted by the serving cell, which is then used to monitor and search for neighboring cells. In these instances, a wireless communication device can sometimes spend time and energy trying to acquire a signal on a nearby channel, where the power measured for the channel is substantially comprised of spilled power from an adjacent channel, and where there is little hope of acquiring a signal. A wireless device can sometimes make several attempts to acquire a signal before exceeding the limit on the allowed number of attempts and attempting to acquire the next channel in the list.

Consequently, there is a need for a method and apparatus for scanning neighboring cells, which can eliminate from consideration and from the list of channels to be scanned, channels where the detected power levels are determined to be substantially comprised of adjacent channel power.

SUMMARY OF THE INVENTION

The present invention provides a method of scanning for neighboring cells. The method includes measuring the channel power from the neighboring cells and sorting the channels based upon the power measurements. An attempt is then made to acquire or otherwise identify a signal from the channels of the neighboring cells in descending order of the sorted power measurements. When a signal from a channel is successfully acquired or otherwise identified, an amount of adjacent channel power is determined, which was produced as part of the signal from the channel successfully acquired or otherwise identified.

The determined adjacent channel power is then compared to the measured power for any corresponding channels in the sorted list of channels. Any channel for which the measured power is substantially comprised of adjacent channel power is then removed from the group of sorted channels.

In at least one embodiment, attempting to acquire a signal from the channels of the neighboring cells includes searching for a signal being transmitted on a selected channel, and attempting to synchronize with the expected signal. In attempting to synchronize with the expected signal the information carried by the signal being transmitted is decoded. Any synchronization data from the information decoded is then retrieved. The synchronization data is then stored in association with the acquired signal.

In at least a further embodiment, determining an amount of adjacent channel power produced includes identifying the type of signal acquired, and matching the signal with at least one of one or more predefined power profiles. In a still further embodiment, the value for the power measured relative to the acquired signal is retrieved, and is used to compute an expected level of interference by reducing the measured power value a predetermined amount corresponding to the expected level of interference for each of the one or more sequentially adjacent channels. In at least some instances, the predetermined amount is based upon the values corresponding to the matched predefined power profile.

The present invention further provides a processor unit for use in a wireless communication device, coupled to a receiver, which establishes and maintains communications within a communication system by scanning for neighboring cells. The processor control unit includes a processor and an interface unit, coupled to said processor and the receiver, for configuring the receiver to receive signals corresponding to one or more neighboring cells, and for receiving characteristics of the signals received. A storage unit is coupled to said processor for storing characteristics of the one or more received signals and one or more sets of instructions for execution by the processor.

The sets of instructions include prestored instructions for determining the measured power levels of the channels transmitted from the neighboring cells and generating a sorted list of channels, based upon measured power levels, prestored instructions for attempting to acquire, via the receiver, signals from the channels of the neighboring cells in descending order of the sorted power measurements, and prestored instructions for removing from the sorted list of channels any of one or more neighboring cells for which the measured power levels is substantially comprised of the adjacent channel power produced as part of a signal successfully acquired or otherwise identified.

In at least one of the embodiments, the processor unit is incorporated as part of a wireless communication device, where the wireless communication device includes a receiver and an antenna coupled to the receiver. In a still further embodiment, the wireless communication device further includes a transmitter coupled to the antenna.

These and other objects, features, and advantages of this invention are evident from the following description of one or more preferred embodiments of this invention, with reference to the accompanying drawings.

BRIEF DESCRIPTION OF THE DRAWINGS

FIG. 5 is a more detailed flow diagram for attempting to acquire or otherwise identify a signal from the channels of the neighboring cells; and FIG. 6 is a more detailed flow diagram for determining the amount of adjacent channel power produced as part of a signal from a channel, that was successfully acquired or otherwise identified.

DETAILED DESCRIPTION OF THE PREFERRED EMBODIMENT(S)

Figure 1:
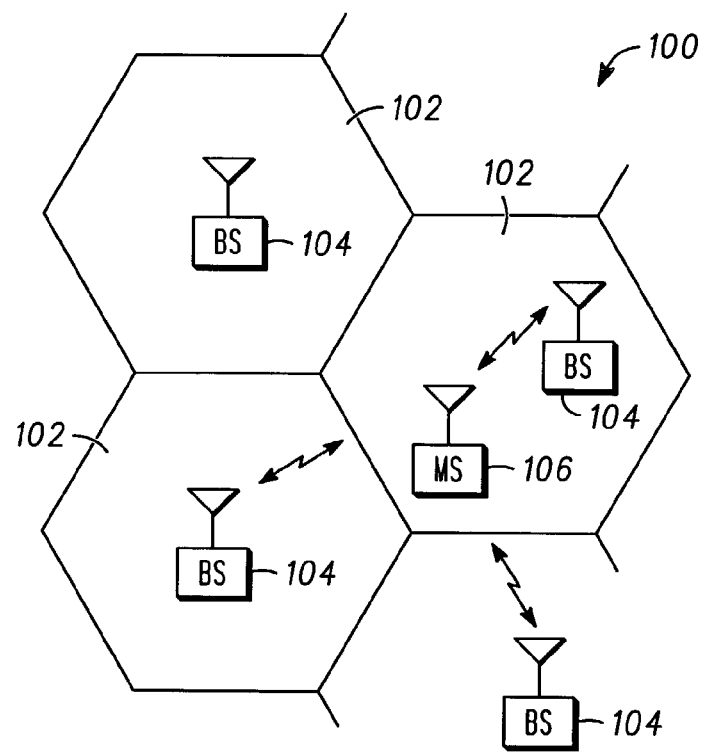
FIG. 1 is an exemplary topographical view of a geographical region representing a portion of the coverage area for a wireless communication system.

While the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

FIG. 1 illustrates an exemplary topographical view of portions of a wireless communication system. The topographical view 100 includes a plurality of cells 102 pictorially represented as hexagons. The hexagons are only rough approximations, where in reality the area of transmission is not so uniformly defined. Each cell is typically served by one or more base stations (BS) 104, referred to as a serving station, which communicates with mobile stations (MS) 106 traveling within the corresponding cell 102.

Generally, the further a mobile station 106 moves away from the serving base station 104 the weaker the signal gets. Conversely, as a mobile station 106 moves toward a base station 104 the signal typically becomes stronger. As a mobile station 106 continues to move away from a serving base station 104 and towards a base station 104 of a neighboring cell 102, at some point it will become desirable to transfer control of the continued communication to the base station 104 of the neighboring cell 102. The decision to transfer control is typically determined based upon the relative strength of the signal received from the serving base station and the base stations of each of the nearby cells 102. Consequently, wireless communication devices operating in association with several over the air operating standards monitor the relative strength of signals from both the serving cell and the one or more nearby neighboring cells.

Generally, the signals from the respective cells are distinguishable, as they are broadcast within distinct channels that are ideally substantially orthogonal to one another. As noted above, the GSM standard includes channels, which are spaced 200 kHz apart. Each of the base stations is assigned one or more frequencies within a predefined band of frequencies. Because a signal being transmitted at one frequency can spill power into neighboring frequencies, sequential channels are preferably not used in the same geographical area.

Figure 2:
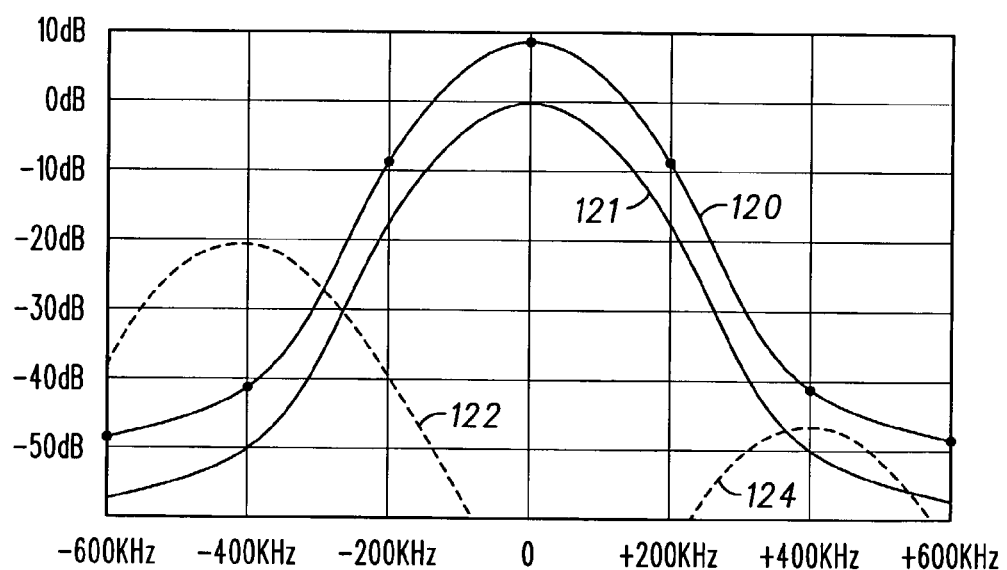
FIG. 2 is a view of an example power profile defining a reference interference level in one or more sequentially adjacent channels for a signal being transmitted in a particular channel.
Figure 3:
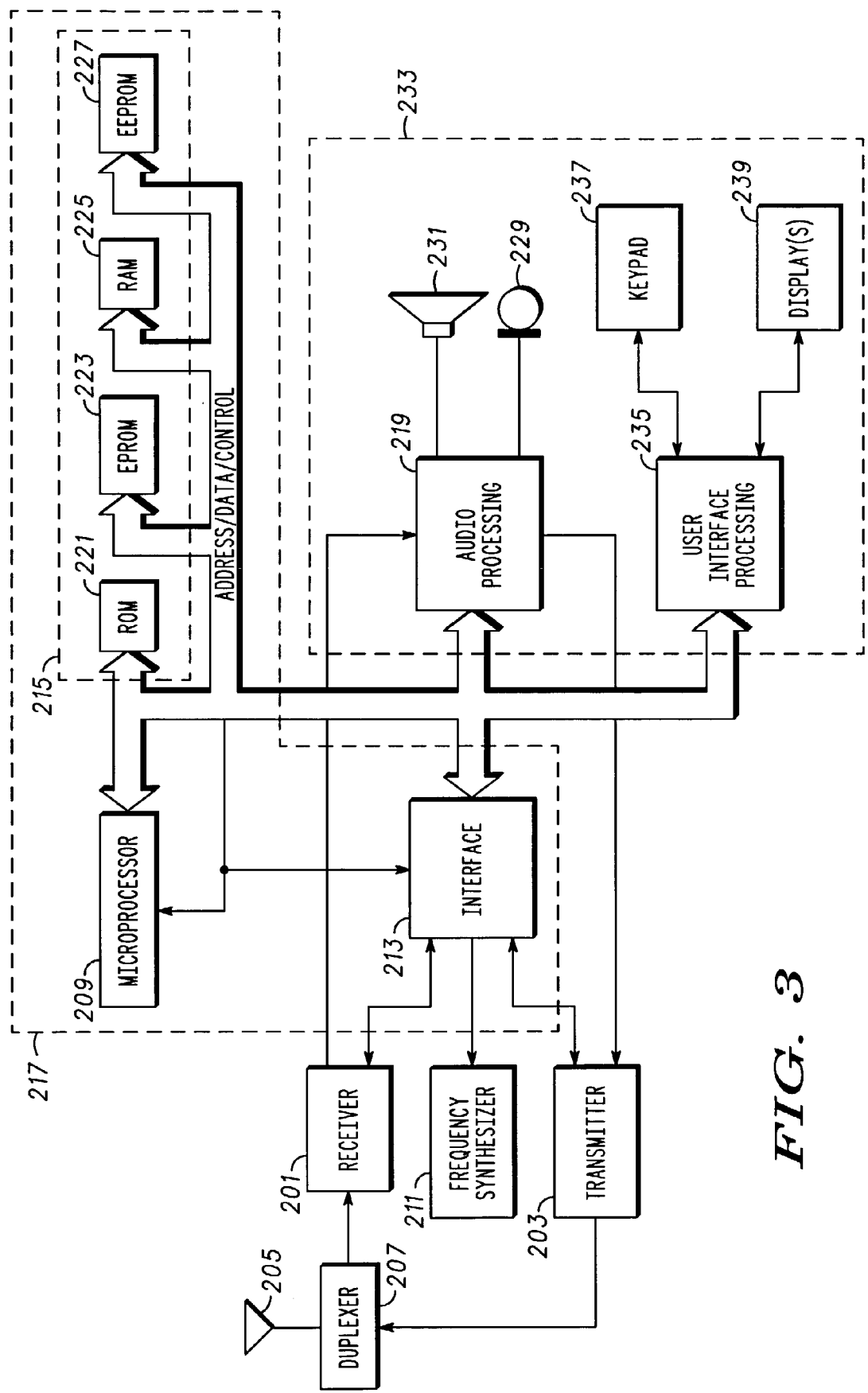
FIG. 3 is a block diagram of the electronic circuitry for at least one embodiment of the wireless communication device, which could be used to incorporate the present invention.

The GSM specification has established very specific limits on the reference interference level, which affects the amount of spilled power that can be transmitted in a sequentially adjacent channel. FIG. 2 illustrates a reference interference level 120 and a corresponding permissible power profile 121 including the level of allowable interference in nearby adjacent channels resulting from a signal being transmitted in a GSM system at a particular frequency, each shown using a solid line. The illustrated relationship between the reference interference level 120 and the permissible power profile assumes a required detection margin of 9 dB. For a GSM system, the requirements for the reference interference levels can be found in the GSM specification 5.05, at section 6.3. The GSM specification allows for +9 dB of cochannel interference, −9 dB of interference in adjacent channels 200 kHz away, −41 dB of interference in adjacent channels 400 kHz away, and −49 dB of interference in adjacent channels 600 kHz away.

In some systems, a detection margin that is different than 9 dB is possible. It may be possible to define detection margins having less than 9 dB, where the system includes improved receiver technology. A system having less than 9 dB may further be possible in a system, which includes additional information with a channel list. For example, some enhanced observed time difference (EOTD) systems reduce the required detection margin by providing predetermined or precomputed synchronization data as part of the additional information (assistance data) transmitted with the channel list (BA list).

The power levels of the channels of the neighboring cells are monitored for purposes of determining when a reselection or a handoff should be performed. The identity of the channels corresponding to the nearby neighboring cells is transmitted to a mobile subscriber by the serving base station in a list, referred to as the BA list. The BA list is intended to limit the necessary searching and can include up to 32 neighboring channels. Unfortunately, there are no rules requiring that the only channels listed are the channels that the mobile subscriber has any likelihood of detecting. Sometimes the BA list includes a block of channels that a particular carrier is using in a location or area. This can sometimes lead to a wireless communication device attempting to acquire a signal for a channel, where the measured power for the channel is substantially comprised of adjacent channel power.

For illustrative purposes, it is assumed that the power profile for signals being transmitted by both the serving and neighboring base stations 104, corresponds to a power profile that is similar to the limits allowed by the GSM specification, as illustrated in FIG. 2. As noted above, these limits can change dependent upon differences in the required detection margin or the defined reference interference levels. Further assume that there exist two additional nearby cells, each respectively transmitting on a channel spaced 400 kHz away. The relative signal strengths, as seen by a mobile station 106, of the signals 122 and 124 from the two neighboring cells are illustrated as dashed lines.

In the first example, the power level of the signal 122 on the channel spaced −400 kHz away has a power level that exceeds both the reference interference level 120 and the spilled power produced by the signal 121, each represented by a solid line. Alternatively, the power level of the signal 124 on the channel spaced +400 kHz away, while having a signal level that exceeds the spilled power produced by the signal 121, has a power level that falls below the required reference interference level 120. In the first instance, an interference margin of approximately 20 dB exists. It is very likely that the signal on the channel spaced −400 kHz could be successfully distinguished from the illustrated interference sources and be successfully acquired. In the second instance, an interference margin of approximately −4 dB exits. Because the power level of the reference interference level exceeds the power level of the signal being transmitted on the channel, it is likely that the signal on the channel spaced +400 kHz could not be acquired. If a mobile station were to attempt to acquire this signal, a mobile station might make several attempts until the number of allowed attempts had been exceeded and the mobile station, then, attempted to acquire the other remaining channels in the list. Not only does this delay the scanning for other channels from the neighboring cells, but futile attempts to acquire a channel uses computational resources that could be devoted to other tasks and/or could allow the wireless communication device to be placed into a power conserving idle mode.

A block diagram is illustrated of the electronic circuitry for at least one embodiment of a wireless communication device 100, corresponding to the mobile station 106 illustrated in FIG. 1. The wireless communication device includes a radio receiver 201 and a transmitter 203. Both the receiver 201 and the transmitter 203 are coupled to an antenna 205 of the wireless communication device by way of a duplexer 207. The particular radio frequency to be used by the transmitter 203 and the receiver 201 is determined by the microprocessor 209 and conveyed to the frequency synthesizer 211 via the interface circuitry 213. Data signals received by the receiver 201 are decoded and coupled to the microprocessor 209 by the interface circuitry 213, and data signals to be transmitted by the transmitter 203 are generated by the microprocessor 209 and formatted by the interface circuitry 213 before being transmitted by the transmitter 203. Operational status of the transmitter 203 and the receiver 201 is enabled or disabled by the interface circuitry 213.

In the preferred embodiment, the microprocessor 209 forms part of the processing unit, which in conjunction with the interface circuitry 213 performs the necessary processing functions under the control of programs stored in a memory section 215. Together, the microprocessor 209 and the interface circuitry 213 can include one or more microprocessors, one or more of which may include a digital signal processor (DSP). The memory section 215 includes one or more forms of volatile and/or non-volatile memory including conventional ROM 221, EPROM 223, RAM 225, or EEPROM 227. Characterizing features of the wireless communication device are typically stored in EEPROM 227 (which may also be stored in the microprocessor in an on-board EEPROM, if available) and can include the number assignment (NAM) required for operation in a conventional cellular system and/or the base identification (BID) required for operation with a cordless base. Additionally stored in the memory section 215 are the multiple sets of prestored instructions used in scanning for neighboring cells.

Control of user audio, the microphone 229 output and the speaker 231 input, is controlled by audio processing circuitry 219, which forms part of a user interface circuit 233. The user interface circuit 233 additionally includes user interface processing circuitry 235, which manages the operation of any keypad(s) 237 and/or display(s) 239. It is further envisioned that any keypad operation could be included as part of a touch sensitive display.

Figure 4:
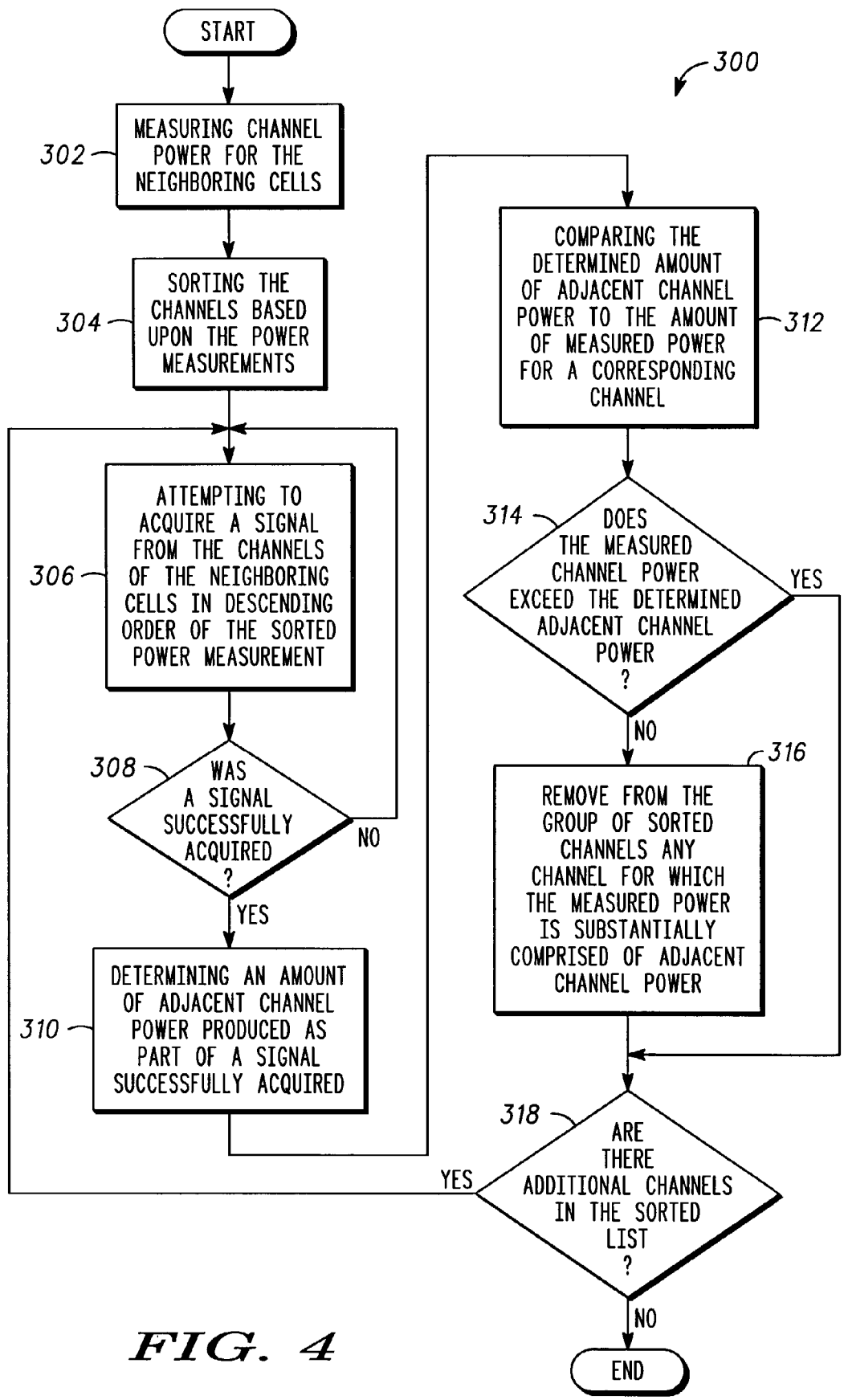
FIG. 4 is a flow diagram of a method for scanning for neighboring cells, in accordance with at least one embodiment of the present invention.

FIG. 4 illustrates a flow diagram 300 of a method for scanning for neighboring cells, in accordance with at least one embodiment of the present invention. Generally the flow diagram can be implemented as part of the one or more sets of prestored instructions stored in the memory section 215 of the processing unit 217 for execution in conjunction with the microprocessor 209. At least one example includes a set of prestored instructions for determining the measured power levels of the channels transmitted from the neighboring cells and generating a sorted list of channels, based upon power measurements. The multiple sets of prestored instructions can further include instructions for attempting to acquire, via the receiver, signals from the channels of the neighboring cells in descending order of the sorted power measurements, and prestored instructions for removing from the sorted list of channels any of one or more neighboring cells for which the measured power level is substantially comprised of the adjacent channel power, that is produced as part of a signal successfully acquired. Corresponding elements are illustrated as part of the flow diagram 300.

More specifically, the method for scanning for neighboring cells, illustrated in the flow diagram 300, initially includes measuring channel power 302 for the neighboring cells. As noted previously, the list of neighboring cells can be included as part of a list, in some instances referred to as a BA list, received from the current serving cell. The channels are then sorted 304, based upon the power measurements.

A signal from the neighboring cells is then attempted to be acquired 306 in descending order of the sorted power measurements. Generally, a finite number of the signals from the channels having the highest power measurements are attempted to be acquired. A determination is then made 308 as to whether a signal for the channel is successfully acquired. If a signal has not yet been successfully acquired, the attempts to acquire a signal continue until a signal is successfully acquired. When a signal has been successfully acquired, an amount of adjacent channel power produced as part of a signal successfully acquired is determined 310. The amount of adjacent channel power is computed based upon a power profile, which is previously known or determined. In any particular system there can be more than one power profile used to compute the adjacent channel power. The specific power profile used can be based upon an identification of the type of signal acquired, or based upon a signal, which has been otherwise identified. A signal otherwise identified could have a source outside of the cellular communication system.

After an amount of adjacent channel power is determined, the determined amount is then compared 312 against the amount of measured power for any corresponding channels in the list. If the measured channel power does not exceed the determined adjacent channel power 314 by a sufficient amount corresponding to a detection margin, if any, then the channel is identified as being substantially comprised of adjacent channel power, and the channel is removed from the sorted list of channels 316 as a channel which should be attempted to be acquired. As noted previously, the detection margin can vary, and in some instances, there may be no detection margin. In this way, a channel that is unlikely to have a signal that can be successfully acquired, but which is present on the list due to having a sufficiently high power measurement, and which substantially comprises adjacent channel power, can be removed without attempting to acquire the signal.

If there are additional channels in the sorted list 318, an attempt is made to acquire a signal from the remaining channels 306. Otherwise, the method is concluded.

FIG. 5 illustrates a more detailed flow diagram 320 for attempting to acquire a signal 306 from the channels of the neighboring cells. The more detailed flow diagram 320 includes searching for a channel 322 from the next channel in the sorted list of channels. A determination is then made 324 as to whether a signal has been found. If a signal is found, the signal is decoded 326 to decipher the information being transmitted. Synchronization data, if present, is then retrieved 328 from the decoded information. The synchronization data is then stored 330 in association with the acquired signal, for use by the wireless communication device, in the event that a decision is made to transfer control to the corresponding neighboring cell for facilitating further communication via the new channel.

FIG. 6 illustrates a more detailed flow diagram 340 for determining an amount of adjacent channel power produced 310 as part of a signal successfully acquired. Initially, the type of signal acquired is identified 342. After the type of signal is identified, the signal is matched 344 with at least one of the one or more predefined power profiles. The power level of the acquired signal is then retrieved 346. The retrieved power level is then reduced an amount 348, based upon a known difference between the primary power levels and the power levels of the expected power produced in each of the adjacent channels as defined by the predefined power profile.

By matching the identified signal to one of the one or more predefined power profiles, signals having different power profiles can be accommodated. Furthermore, the adjacent power levels being determined and being compared with the group of sorted channels can be determined in connection with acquiring the signal from the channel on which the wireless communication device is presently communicating, or from a channel successfully acquired as part of the scanning for neighboring cells.

In order to help further illustrate the present invention, reference is made to the example illustrated in FIG. 2. If the BA list included in the list of channels for the neighboring cells the channels at 0 kHz, +400 kHz and −400 kHz, after measuring the channel power levels and sorting the same, the sorted list of channels would include, in order, the channel at 0 kHz, −400 kHz and +400 kHz. Having the highest power level in the sorted list, an attempt to acquire a signal from the channel at 0 kHz would be made. Upon successful acquisition of the channel, a determination would be made as to the expected power levels produced in the adjacent channels by the transmission of the acquired signal.

The determined power levels of the adjacent channels would then be compared against the actually measured power levels of the adjacent channels. In at least some instances, this will include taking into account a corresponding detection margin, if any. If the measured power levels did not exceed the expected power levels produced by adjacent channel power, the channel would be removed from the list on the assumption that an attempt to acquire a signal at that channel would be futile given the known level of interference or noise produced as part of signal of the already acquired channel. In this instance the channel at +400 kHz would be eliminated from the list. However, because the measured power levels at −400 kHz exceeds the determined adjacent channel power produced as part of the signal transmitted at channel 0 kHz, the channel at −400 kHz would remain in the list of channels to be acquired and an attempt to acquire the signal at −400 kHz might still be made.

If the BA list had additionally included the channels at +200 kHz and −200 kHz, these channels would have been similarly eliminated from consideration, based upon an analysis of the adjacent channel power produced as part of the signal transmitted at channel 0 kHz. Previously a wireless communication device, generally, would have attempted to acquire a signal at −200 kHz and +200 kHz, based upon the presence of a substantial power level, if the channel had been included in the BA list. This is the case, despite the fact that the power levels were substantially comprised of adjacent channel power, and that no measurable legitimate signal exists on the channel. By removing these channels from the list of channels to be acquired, channels which can not be acquired are eliminated from the process for scanning for neighboring cells without going through the process of attempting to acquire the signal, resulting in a more efficient process.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A method for scanning for neighboring cells comprising:
   measuring the channel power from the neighboring cells;
   sorting the channels based upon the power measurements;
   attempting to acquire or otherwise identifying a signal from the channels of the neighboring cells in decoding order of the sorted power measurements;
   determining an amount of adjacent channel power produced as part of a signal from a channel, that was successfully acquired or otherwise identified;
   comparing the determined adjacent channel power to the measured power for the corresponding channel; and
   removing from the group of sorted channels, any channel for which the measured power is substantially comprised of adjacent channel power.

2. A method in accordance with claim 1 further comprising receiving a list of neighboring cells from the serving cell.

3. A method in accordance with claim 1, wherein attempting to acquire a signal from the channels of the neighboring cells includes attempting to acquire the signals from a predetermined number of neighboring cells having the highest power measurements, which form the group of sorted channels.

4. A method in accordance with claim 3, wherein when a channel is removed from the group of sorted channels, a channel having the next highest power measurement, which is not already part of the group and has not been previously removed from the group, is added to the group.

5. A method in accordance with claim 1, wherein attempting to acquire a signal from the channels of the neighboring cells includes:
   searching for a signal being transmitted on a selected channel; and
   attempting to synchronize with the expected signal including
      decoding the information carried by the signal being transmitted,
      retrieving any synchronization data from the information decoded, and
      storing the synchronization data in association with the acquired signal.

6. A method in accordance with claim 1, wherein determining the amount of adjacent channel power produced as part of a signal from a channel, that was successfully acquired includes:
   retrieving the value for the power measured relative to the acquired signal;
   reducing the measured power value a predetermined amount corresponding to the expected level of interference for each of the one or more sequentially adjacent channels.

7. A method in accordance with claim 6, wherein the measured power is substantially comprised of the determined adjacent channel power, produced as part of a signal successfully acquired, if the measured power level of the adjacent channel does not exceed the expected level of interference.

8. A method in accordance with claim 6, wherein the expected level of interference corresponds to a predefined power profile.

9. A method in accordance with claim 1, wherein determining an amount of adjacent channel power produced includes:
   identifying the type of signal acquired, and
   matching the signal with at least one of one or more predefined power profiles.

10. A method in accordance with claim 1, wherein the signals from the channels of the neighboring cells includes signals from at least one of a predesignated frame or time slot.

11. A method in accordance with claim 1, wherein scanning for neighboring cells is performed as part of at least one of a reselection process, while in idle mode, and a handover process, while in dedicated mode.

12. A method in accordance with claim 1, wherein scanning for neighboring cells is performed by a wireless communication device for establishing and maintaining communication with one or more base stations within broadcast range of the device.

13. A method in accordance with claim 12, wherein said wireless communication device is a portable handheld communication device.

14. A method in accordance with claim 1, wherein being substantially comprised of adjacent channel power includes not exceeding the adjacent channel power by an amount corresponding to a predefined detection margin.

15. A processor unit for use in a wireless communication device, coupled to a receiver, which establishes and maintains communications within a communication system by scanning for neighboring cells, said processor control unit comprising:
   a processor;
   an interface unit coupled to said processor and the receiver for configuring the receiver to receive signals corresponding to one or more neighboring calls, and for receiving characteristics of the signals received;
   a storage unit coupled to said processor for storing characteristics of the one or more received signals and one or more sets of instructions for execution by the processor; and
   prestored instructions for determining the measured power levels of the channels transmitted from the neighboring cells and generating a sorted list of channels, based upon measured power levels;
   prestored instructions for attempting to acquire, via the receiver, signals from the channels of the neighboring cells in descending order of the sorted power measurements; and
   prestored instructions for removing from the sorted list of channels any of one or more neighboring cells for which the measured power level is substantially comprised of adjacent channel power produced as part of a signal successfully acquired or otherwise identified.

16. A wireless communication device comprising:
   a receiver;
   an antenna coupled to said receiver;
   a processor control unit including
      a processor, an interface unit coupled to said processor and the receiver for receiving the signal characteristics of the signals received for the one or more neighboring cells, a storage unit coupled to said processor for storing signal characteristics of the one or more received signals and one or more sets of instructions for execution by the processor, prestored instructions for determining the measured power levels of the channels transmitted from the neighboring cells and generating a sorted list of channels, based upon measured power levels, prestored instructions for attempting to acquire, via the receiver, signals from the channel of the neighboring cells in descending order of the sorted power measurements, and prestored instructions for removing from the sorted list of channels any of one or more neighboring cells for which the measured power level is substantially comprised of adjacent channel power produced as part of a signal successfully acquired or otherwise identified; and a user interface circuit.

17. The wireless communication device of claim 16 further comprising a transmitter coupled to the antenna.

18. The wireless communication device of claim 16 wherein said user interface circuit includes at least one of a speaker, a microphone, a keypad and a display.

* * * * *